May 14, 1963 K. W. TANTLINGER ETAL 3,089,711
LANDING GEAR
Filed Nov. 27, 1961 5 Sheets-Sheet 5
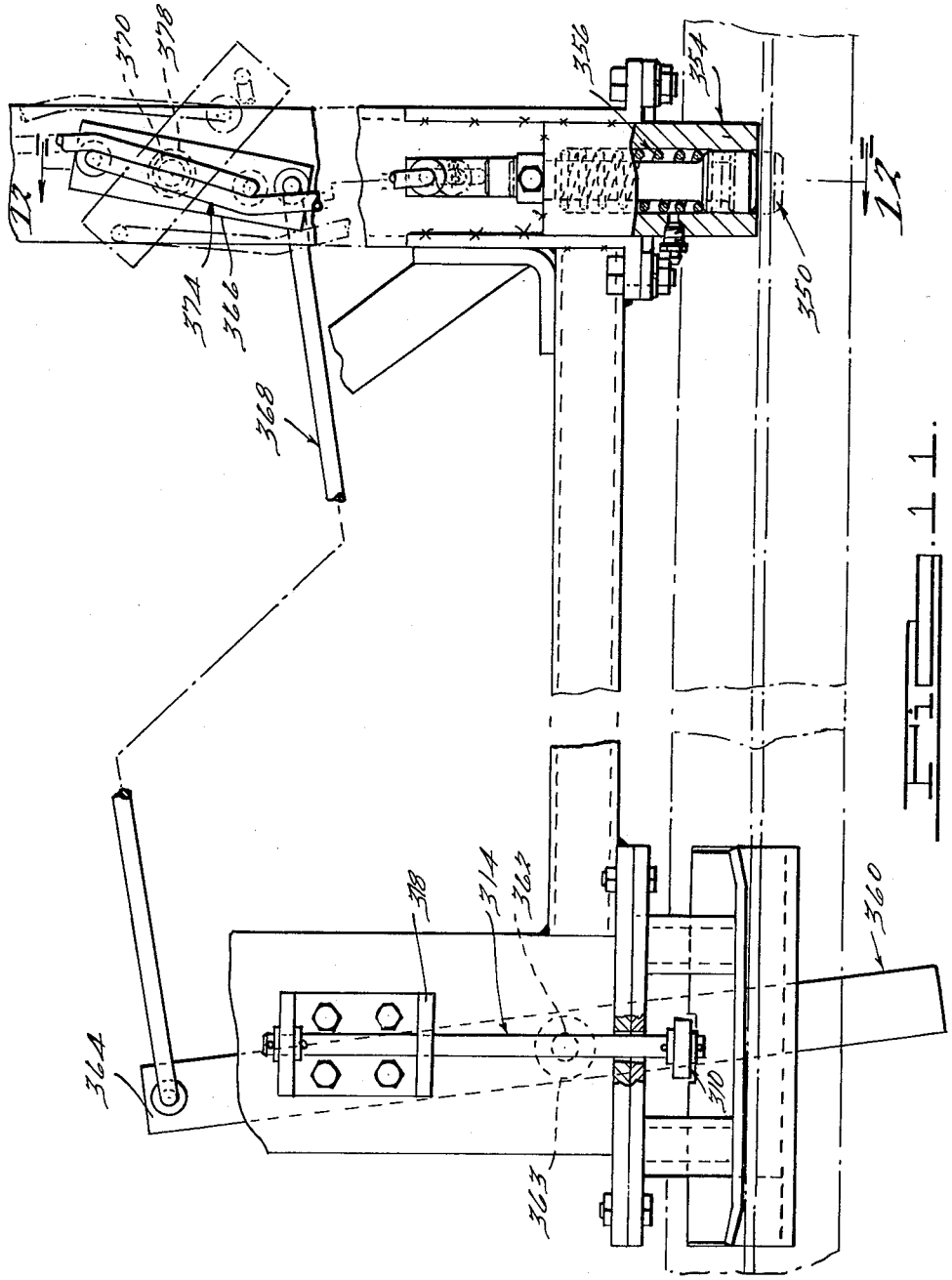
INVENTORS
Keith W. Tantlinger
George Chieger
BY
Barnes, Dickey & Pierce
ATTORNEYS

United States Patent Office 3,089,711
Patented May 14, 1963

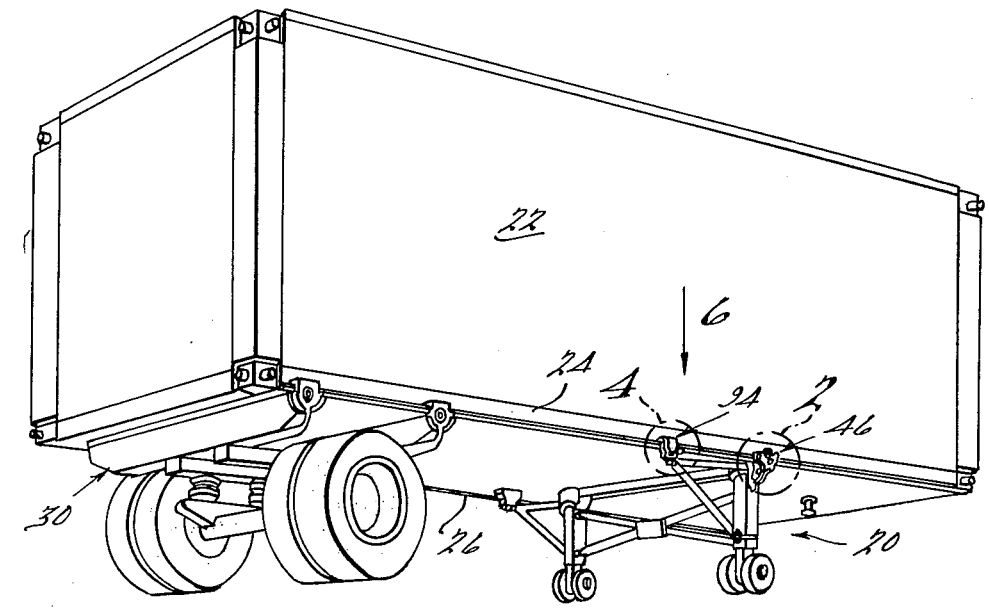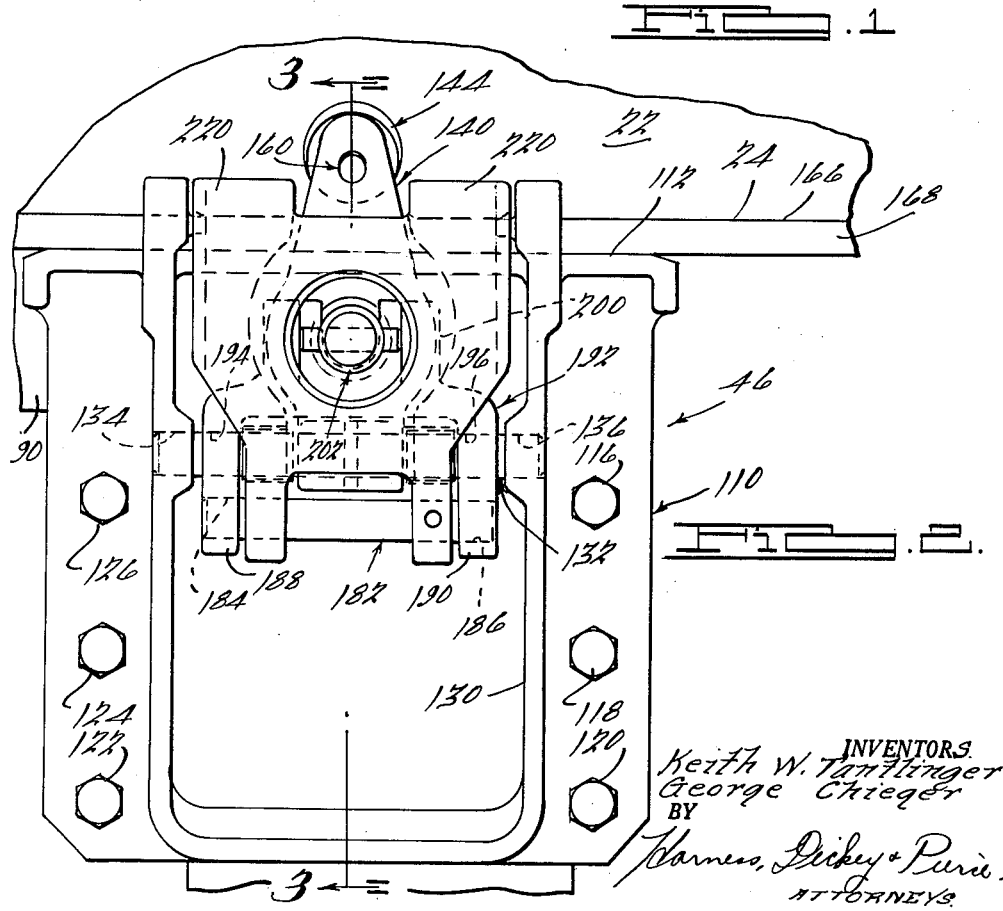

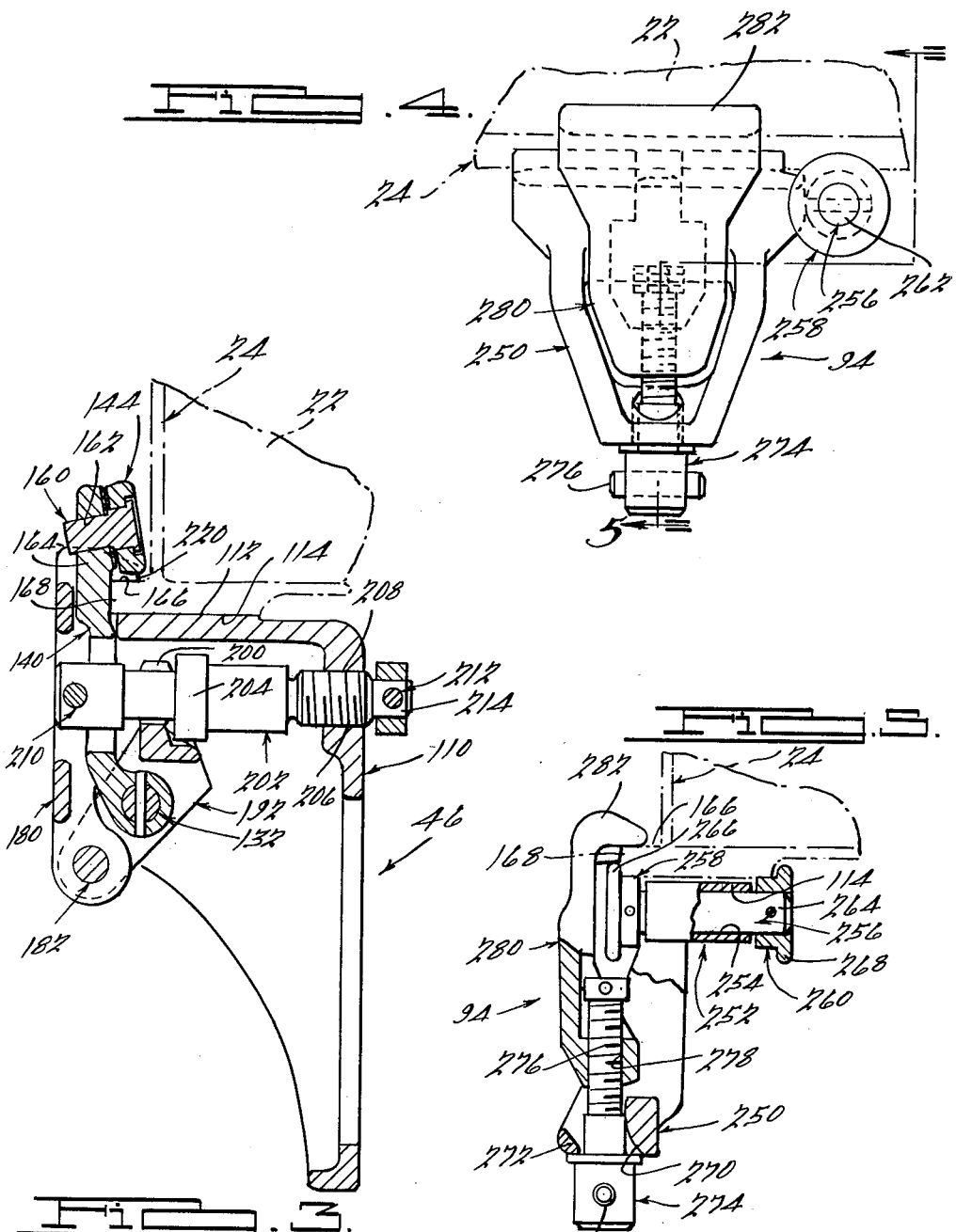

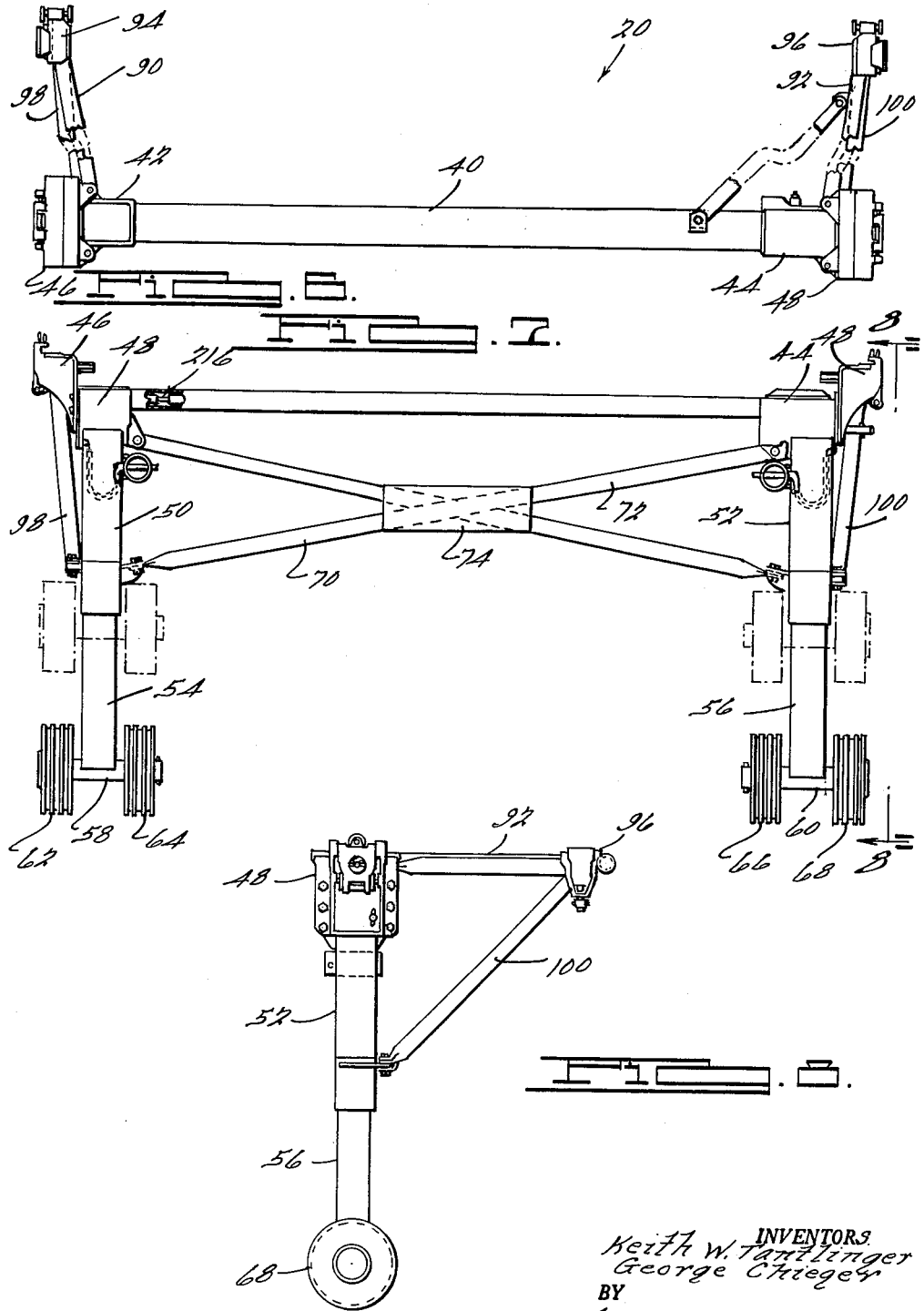

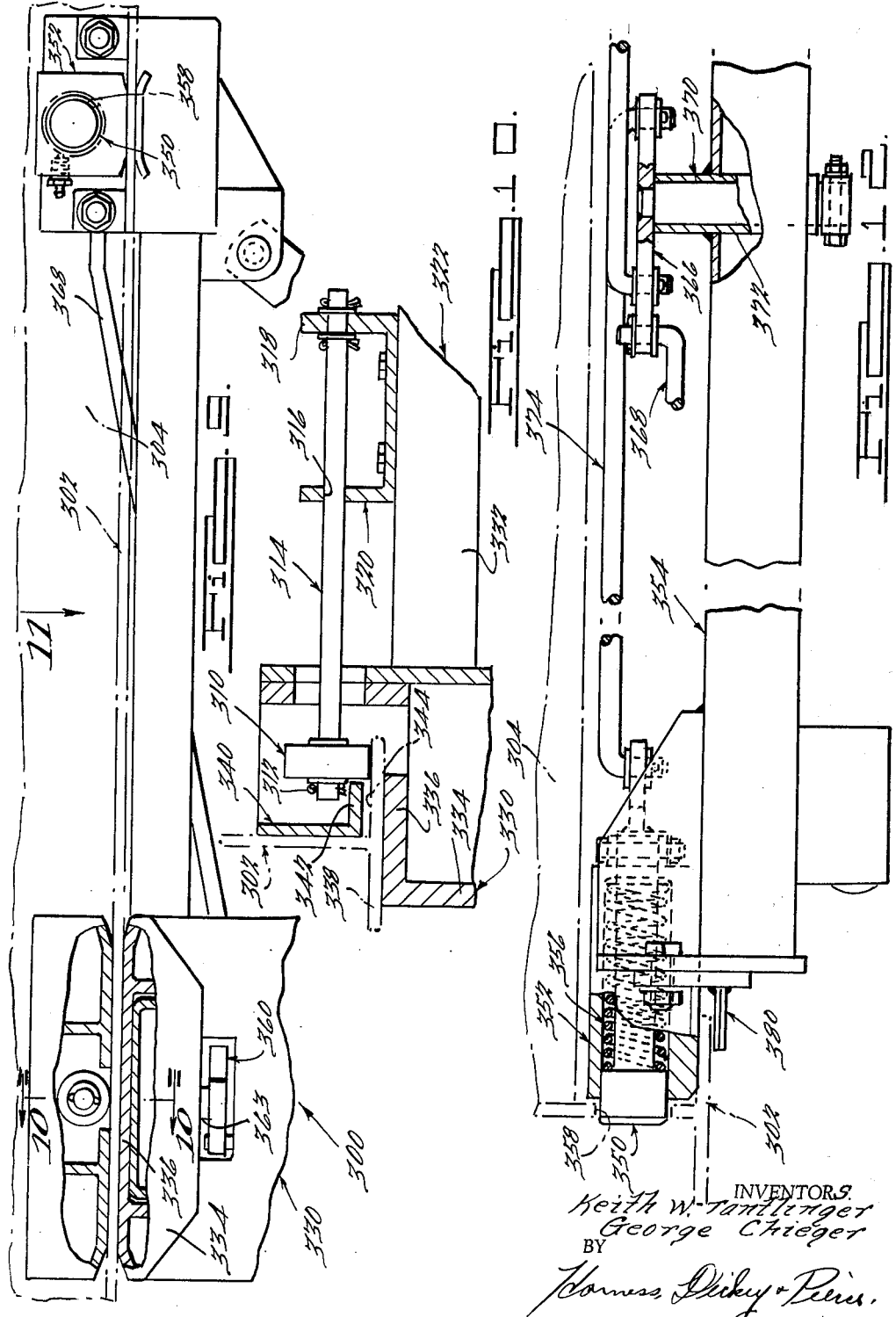

3,089,711
LANDING GEAR
Keith W. Tantlinger, Grosse Pointe Shores, and George Chieger, Grosse Pointe Woods, Mich., assignors to Fruehauf Trailer Company, Detroit, Mich., a corporation of Michigan
Filed Nov. 27, 1961, Ser. No. 154,985
4 Claims. (Cl. 280—150.5)

This invention relates to a releasable rolling landing gear for a shipping container, trailer or the like.

The advent of the adjustable and removable wheel suspension which can be coupled to, for example, a shipping container or vehicle frame to facilitate highway travel thereof, has emphasized the need for a removable and adjustable landing gear complementary to and usable with such shipping apparatus.

The landing gear of the present invention has particular utility in combination with a shipping container of the type disclosed in application Serial No. 112,635, filed May 25, 1961 for: Shipping Apparatus and assigned to the assignee of the instant invention and is particularly adapted for use in combination with the wheel suspension disclosed in application Serial No. 38,826 for: Trailer Suspension and assigned to the assignee of the present invention.

A rolling landing gear in accordance with the present invention is provided with a pair of downwardly depending legs having ground-engaging wheels, respectively, that are vertically retractable in the conventional manner. The landing gear has a plurality of spaced rolls that are engageable with complementary rails on, for example, a shipping container to facilitate fore and aft movement of the landing gear with respect to the container. The landing gear is secured to the rails of the container by a novel clamp mechanism that is readily adjusted between the clamp or unclamped condition to facilitate longitudinal positioning of the landing gear with respect to the container and to condition the landing gear for disengagement from the shipping container.

Accordingly, one object of the present invention is an improved landing gear for shipping containers, trailers or the like.

Another object is a rolling landing gear.

Another object is a rolling landing gear that is easily lockable at a desired position longitudinally of a shipping container or the like.

Another object is a rolling landing gear that is compatible with conventional shipping apparatus.

Another object is a rolling landing gear that can be dropped away from a container or the like.

Other objects and advantages of the present invention will be apparent in the following specification, claims and drawings wherein:

FIGURE 1 is a perspective view of a rolling landing gear in operative association with a shipping container;

FIG. 2 is a view taken within the circle 2 of FIGURE 1;

FIG. 3 is a cross-sectional view taken substantially along the line 3—3 of FIG. 2;

FIG. 4 is a view taken within the circle 4—4 of FIGURE 1;

FIG. 5 is a cross-sectional view taken substantially along the line 5—5 of FIG. 4;

FIG. 6 is a top view of the rolling landing gear of FIGURE 1 with the container removed therefrom;

FIG. 7 is a front view of the rolling landing gear of FIG. 6;

FIG. 8 is a side view of the rolling landing gear of FIG. 7;

FIG. 9 is a side view, similar to FIG. 8, of a modified rolling landing gear;

FIG. 10 is a view taken substantially along the line 10—10 of FIG. 9;

FIG. 11 is a view taken in the direction of the arrow 11 of FIG. 9; and

FIG. 12 is a view taken substantially along the line 12—12 of FIG. 11.

Referring to FIGURE 1, a rolling landing gear 20, in accordance with one embodiment of the present invention, is shown coupled to a shipping container 22 of the type described in the aforementioned application Serial No. 112,635. The shipping container 22 is provided with longitudinally extending rail portions 24 and 26 on the lower longitudinal edges thereof for the support of the rolling landing gear 20 and for the support of a wheel suspension 30, of the type disclosed in the aforementioned application Serial No. 38,826. The landing gear 20 is adapted to roll on the rails 24 and 26 so as to be positionable longitudinally of the container 22, as will be described.

As best seen in FIGS. 6, 7 and 8, the rolling landing gear 20 comprises a lateral member 40 of box-like construction having a pair of end brackets 42 and 44 at opposite ends thereof for the support of a pair of roll housings 46 and 48, respectively. A pair of legs 50 and 52 having extendable portions 54 and 56, are secured to the end brackets 42 and 44, as by welding, for the support of a pair of axles 58 and 60, respectively. The axle 58 is provided with a pair of wheels 62 and 64 and the axle 60 with a pair of wheels 66 and 68, respectively. The portions 54 and 56 of the legs 50 and 52 are movable vertically with respect thereto as by a conventional rack and gear (not shown).

The legs 50 and 52 are reinforced laterally by a pair of cross braces 70 and 72 that are secured to the brackets 42 and 44 and legs 50 and 52, respectively. A center plate 74 is welded to the cross braces 70 and 72 to rigidify the structure.

A pair of upper trailing arms 90 and 92 extend rearwardly from the brackets 42 and 44 for the support of a pair of rear roll support housings 94 and 96, respectively. The housings 94 and 96 are braced by a pair of lower trailing arms 98 and 100, respectively, that are secured to the legs 50 and 52, respectively. Thus, the housings 94 and 96 are rigidly supported in rearwardly spaced longitudinally aligned relationship with respect to the roll support housings 46 and 48.

As best seen in FIGS. 2 and 3, the roll support housing 46, which is identical in construction to the housing 44, comprises a frame 110 having an upper edge face 112 for engagement with a bottom face 114 of the rail 24 on the container 22. As best seen in FIG. 2, the frame 110 is of open box-like configuration and is secured to the bracket 42 as by a plurality of bolts 118, 120, 122, 124 and 126.

The frame portion 110 of the housing 46 has a central aperture 130 therein with a roll arm support shaft 132 extending thereacross. The shaft 132 is supported in complementary apertures 134 and 136 in the frame 110. A roll support arm 140 is journaled on the shaft 132 for the support of a roll 144.

A roll 144 is supported for rotation with respect to the arm 140 by a shaft 160 that is accepted in a complementary bore 162 in an upper end portion 164 of the arm 140. The roll 144 is engageable with an upper edge face 166 of an outwardly extending flange 168 on the rail 24 of the shipping container 22 thereby to condition the landing gear 20 for rolling movement longitudinally of the rail 24. The landing gear 20 is adapted to be clamped to the rail 24 of the container 22 by a clamping arm 180. The arm 180 is supported on a shaft 182 that extends laterally of the opening 130 in the housing 46 in spaced parallel relation to the shaft 132. Thus, the roll support arm 140 and clamp arm 180 are rotatable about spaced parallel axes.

The shaft 182 is accepted in complementary apertures 184 and 186 in leg portions 188 and 190 of a toggle yoke 192.

The leg portions 188 and 190 of the toggle yoke 192 also have apertures 194 and 196 therein for the acceptance of the shaft 132.

An upper end portion 200 of the toggle yoke 192 is of upwardly opening generally U-shaped vertical cross section for the acceptance of a clamping shaft 202. The shaft 202 has a collar 204 thereon that is engageable with the upper end portion 200 of the toggle yoke 192 to effect rotation thereof about the shaft 132 upon rotation of the shaft 202, as will be described.

The shaft 202 has a threaded inner end portion 206 that is engageable in a complementary threaded bore 208 in the frame portion 110 of the housing 46 so that, upon rotation of the shaft 202, as by engagement of a conventional crank (not shown) with a pin 210 thereon, the shaft 202 is advanceable axially of the bore 208. A pin 212 extends through an inner end portion 214 of the shaft 202 to facilitate coupling thereof to a transversely extending shaft 216 (FIG. 7), thereby to effect concomitant clamping and unclamping of the housings 46 and 48 on the rails 24 and 26, respectively. As best seen in FIG. 3, advancement of the shaft 202 to the left effects counterclockwise movement of the toggle yoke 192 about the shaft 132, thereby drawing the shaft 182 downwardly to engage a goosenecked portion 220 of the clamp 180 with the upper edge face 166 on the flange 168 of the rail 24. Movement of the shaft 202 to the right, as seen in FIG. 3 of the drawings, permits clockwise rotation of the toggle yoke 192 and upward movement of the shaft 182 and clamp 180 thereby permitting the landing gear 20 to move downwardly relative to the rail 24 of the container 22 under its own weight, bringing the roll 144 into engagement with the upper surface 166 on the flange 168 of the rail 24.

It is to be noted that continued advancement of the shaft 202 to the right, as seen in FIG. 3, clears the gooseneck portion 220 of the clamp 180 from the flange 168, permitting the clamp 180 to be pivoted counterclockwise about the shaft 182 completely away from the rail 24. After the clamp 180 is cleared from the rail 24, the roll support arm 140 can be pivoted counterclockwise about the shaft 132 to clear the rail 24 and condition the landing gear 20 for vertical movement relative to the container 22. In this manner, the landing gear 20 can be dropped away from the container 22, or, alternatively, the container 22 can be lifted away from the landing gear, as by a conventional spreader bar or the like (not shown).

Referring to FIGS. 4 and 5 of the drawings, the rear roll support housing 94 comprises an upwardly opening generally U-shaped frame member 250 that is secured to the trailing arms 90 and 98, as by welding. The frame member 250 has a laterally extending sleeve 252 with a bore 254 therein for the acceptance of a complementary roll support shaft 256. A pair of rolls 258 and 260 are supported on opposite ends 262 and 264 of the shaft 256 for engagement with the lower edge face 114 of the rail 24. The rolls 258 and 260 have peripheral lips 266 and 268, respectively, that position the housing 94 laterally with respect to the rail 24. The frame member 250 has an upwardly extending aperture 270 in a lower end portion 272 thereof for the acceptance of a clamp support shaft 274. The clamp support shaft 274 has a threaded portion 276 that is accepted in a complementary threaded bore 278 in a clamp member 280. An upper end portion 282 of the clamp member 280 is of goosenecked configuration so as to be engageable with the upper edge face 166 on the flange 168 of the rail 24.

As seen in FIG. 5, movement of the clamp 280 downwardly is effected by rotation of the shaft 274 by engagement of a pin 284 thereon with a conventional crank (not shown). Downward movement of the clamp 280 effects clamping of the frame member 250 with respect to the rail 24. Upward movement of the clamp 280 obviously unclamps the member 250 from the rail 24.

It is to be noted that the rolls 258 and 260 underlie the rail 24, since the weight of the landing gear 20 tends to rotate the rolls 258 and 260 upwardly against the rail 24.

It is also to be noted that the aperture 270 in the yoke 230 is so proportioned that the clamp 280 and screw 276 can be rotated counterclockwise, as seen in FIG. 5 of the drawings, with respect to the frame member 250 thereby to completely disassociate the clamp 280 from the rail 24. Upon disengagement of the clamp 280 from the rail 24, the container 22 can be moved directly upwardly from the landing gear 20, or, alternatively, the landing gear 20 can be dropped away from the container 22.

As best seen in FIGS. 9–12, a modified rolling landing gear 300 is shown in operative association with a bottom rail 302 of a shipping container 304 or the like. It is to be understood that opposite sides of the landing gear 300 are of similar construction. Therefore, only one side will be described hereinafter for the purpose of clarity.

The landing gear 300 comprises a pair of downwardly depending legs, as best seen in FIG. 10, and associated reinforcement components similar to the components of the landing gear 20. The landing gear 300, however, features a novel cantilevered roll 310 (FIG. 10) that is supported on an end portion 312 of a roll support shaft 314. The shaft 314 extends through complementary apertures 316 and 318 in a generally U-shaped bracket 320. The bracket 320 is secured to a transverse member 322, as by welding.

An end housing 330 is secured to an end portion 332 of the transverse member 322, as by welding. The housing 330 has an outer end plate 334 with an inwardly directed flange 336 thereon for seating engagement with a horizontally extending lower flange 338 on the rail 302. It is to be noted that the roll 310 of the landing gear 300 is disposed interiorly of the lower rail 302, as distinguished from the roll 144 of the landing gear 20, which engages the outer edges of the rail 24.

The housing 330 has a longitudinally extending upper plate 340 with a horizontally extending lower flange 342 that is engageable with an upper edge face 344 of the rail 302, upon deflection of the shaft 314 and roll 310 upwardly due to, for example, excessive loading of the landing gear. Excessive loading of the landing gear 300 may occur when, for example, the wheels of the landing gear 300 are frozen in ice. When this condition obtains, movement of the trailer or shipping container tends to load the roll support shaft 314 of the landing gear 300 excessively, which, in the absence of the plate 340, could seriously damage the roll support shaft 314. However, flexure of the shaft 314 is limited upon engagement of the flange 342 with the face 344 on the rail 302.

The landing gear 300 is indexed longitudinally of, for example, the shipping container 304 by a locking pin 350. It is to be understood that both sides of the landing gear 300 have locking pins thereon which are actuated simultaneously, as will be described.

The locking pin 350 is supported in a complementary bearing block 352 that is secured to a laterally extending rear frame member 354, as by welding. The pin 350 is normally biased outwardly of the block 352 by a helical compression spring 356, so as to extend through a complementary aperture 358 in the rail 302. The rail 302 is provided with a number of longitudinally spaced apertures 358 so that the landing gear 300 can be secured at any desired position longitudinally of the shipping container 304.

The pin 350 is retracted upon rotation of a manual operator 360 at the forward end of the landing gear 300. The operator 360 is pivotally supported by a shaft 362 that is journaled by a suitable bearing sleeve 363 (FIG. 9) in the lateral member 322. An inner end portion 364 of the manual operator 360 is connected to a crank 366 as by a linkage rod 368. The crank 366 is pivotally supported on a shaft 370 that is journaled in a complementary sleeve 372 secured to the member 354, as by welding.

The locking pin 350 is connected to the crank 366 by a connecting rod 374 whereby rotation of the manual operator 360 counterclockwise about the shaft 362 effects a clockwise rotation of the crank 366 and retraction of the pin 350, thereby to condition the landing gear 300 for movement to a desired position longitudinally of the shipping container.

It will be noted that a laterally extending plate 380 underlies the rail 302 to accept the weight of the container 304.

From the foregoing description, it should be apparent that, when in an unlocked condition, a landing gear in accordance with the instant invention is rollably supported for movement longitudinally of a shipping container or trailer frame thereby to render longitudinal adjustment of the landing gear a relatively simple operation.

It is to be understood that the specific constructions of the improved landing gear herein disclosed and described are presented for the purpose of explanation and illustration and are not intended to indicate limits of the invention, the scope of which is defined by the following claims.

What is claimed is:
1. A landing gear for a shipjing container or the like having a pair of laterally spaced longitudinally extending lower side rails, said landing gear comprising
   a pair of downwardly depending legs,
   a first pair of rolls
      at the upper ends of said legs, respectively, engageable with the rails on the container for rollably supporting said landing gear,
   a pair of clamps
      at the upper end of said legs, respectively, for clamping said landing gear to the side rails of the container, and
   a second pair of rolls
      spaced longitudinally of said first rolls, respectively, releasably engageable with the rails of the shipping container to facilitate longitudinal movement of said landing gear relative to the shipping container.
2. A landing gear for a shipping container or the like having a pair of laterally spaced longitudinally extending lower side rails, said landing gear comprising
   a pair of downwardly depending legs,
   a first pair of rolls
      at the upper ends of said legs, respectively releasably engageable with the rails on the container for rollably supporting said landing gear,
   a first pair of clamps
      at the upper ends of said legs, respectively releasably engageable with the side rails of the container,
   a second pair of rolls
      spaced longitudinally of said first rolls, respectively, releasably engageable with the rails of the shipping container, and
   a second pair of clamps
      spaced longitudinally of said first pair of clamps releasably engageable with the side rails of the container.
3. A landing gear for shipping apparatus having a pair of laterally spaced longitudinally extending lower side rails, said landing gear comprising
   a pair of downwardly depending legs,
   a first pair of rolls
      at the upper ends of said legs, respectively, releseably engageable with the rails on the shipping apparatus for rollably supporting said landing gear,
   a first pair of clamps
      at the upper end of said legs, respectively, releasably engageable with the side rails of the shipping apparatus,
   a second pair of rolls
      spaced longitudinally of said first rolls, respectively, releasably engageable with the rails of the shipping apparatus, and
   a second pair of clamps
      spaced longitudinally of said first pair of clamps releasably engageable with the side rails of the shipping apparatus, said first and second pairs of clamps being movable away from vertically aligned relationship with the rails of the shipping apparatus to condition the apparatus for relative vertical movement with respect to said landing gear.
4. A landing gear for shipping apparatus having a pair of laterally spaced longitudinally extending lower side rails, said landing gear comprising
   a pair of downwardly depending legs,
   a pair of rolls
      at the upper ends of said legs, respectively, resiliently engageable with the rails on the shipping apparatus for rollably supporting said landing gear,
   support means
      at the upper end of said legs, respectively, releasably engageable with one side of the side rails of the shipjing apparatus for supporting the weight thereof, and
   means
      for engaging the other side of the rails on the shipping apparatus to preclude excessive loading of said rolls.

References Cited in the file of this patent

UNITED STATES PATENTS

| 1,313,087 | Hartwick | Aug. 12, 1919 |
| 2,650,055 | Perkins | Aug. 25, 1953 |
| 2,896,967 | Dalton | July 28, 1959 |

FOREIGN PATENTS

| 759,103 | France | Nov. 16, 1933 |